May 10, 1966 R. G. HOLLINGER 3,250,486

TAPE THREADING DEVICE

Filed Feb. 24, 1964 2 Sheets-Sheet 1

INVENTOR.
RICHARD G. HOLLINGER

BY Donnelly, Mentag & Harrington

ATTORNEYS

INVENTOR.
RICHARD G. HOLLINGER

BY Donnelly, Mentag & Harrington

ATTORNEYS

United States Patent Office 3,250,486

Patented May 10, 1966

3,250,486

TAPE THREADING DEVICE

Richard G. Hollinger, 10745 Kingston, Huntington Woods, Mich.

Filed Feb. 24, 1964, Ser. No. 346,814
3 Claims. (Cl. 242—74.2)

This invention relates generally to the tape recording art, and more particularly, to a device for starting a recorder tape on a tape recorder reel.

The starting of a recorder tape on a tape recorder reel commences with the insertion of a free end of the tape through a slot and into a hole formed in the hub of the reel, and then the reel is revolved in order to wind the tap around the hub of the reel and past the slot leading into said hole, so as to overlap the tape end leading into the hole and retain the tape on the reel against slippage. The starting of a recorder tape in the aforedescribed manner heretofore has been an involved and time-consuming, and sometimes, exasperating operation. Accordingly, it is the primary object of the present invention to provide a novel tap recorder reel starter capable of starting a recorder tape on a reel in a simple manner and in a minimum of time.

It is another object of the present invention to provide a novel tape recorder reel starter which is simple and compact in construction, efficient in operation, and which is economical to manufacture.

It is a further object of the present invention to provide a novel tape recorder reel starter which incorporates a pair of arms which are connected for movement relative to each other, one of the arms being provided with a cushioned seat adapted to be inserted into the tape starting hole in a tape recorder reel, and the other of said arms being provided with a threading blade which is adapted to pick up the free end of a recorder tape and move it into the seat on the first arm and to retain the tape in said hole while the reel is turned to wind the lead end of the tape in position on the reel.

Other objects, features and advantages of this invention will be apparent from the following detailed description, appended claims, and the accompanying drawings.

Figure 4:
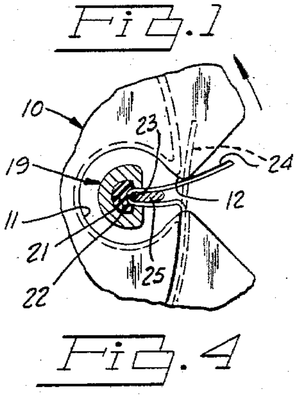
FIG. 4 is a fragmentary, horizontal sectional view of the structure illustrated in FIG. 2, taken along the line 4—4 thereof, and looking in the direction of the arrows.
Figure 6:
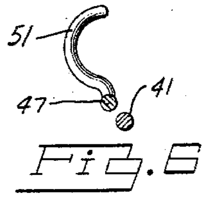
FIG. 6 is a fragmentary, elevational sectional view of the structure illustrated in FIG. 5, taken along the line 6—6 thereof, and looking in the direction of the arrows.

Referring now to the drawings and in particular to FIGS. 1 through 4, wherein is shown a first embodiment of the invention, the numeral 10 generally indicates a conventional tape recorder reel upon which a recorder tape may be quickly and easily started by means of the apparatus of the present invention. As best seen in FIG. 4, the reel 10 is provided with a tape starting hole 11 which is formed in the hub of the reel and which is provided with the entrance slot 12.

Figure 1:
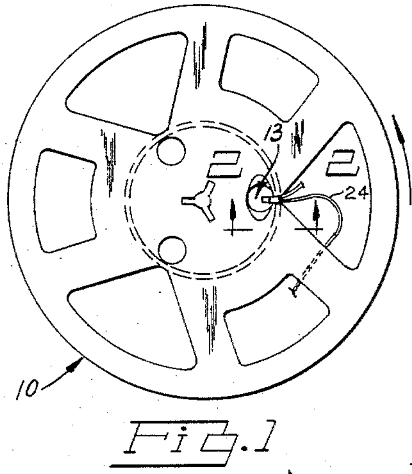
FIG. 1 is a plan view of a tape recorder reel, and showing a first embodiment of the invention in an operative position starting a recorder tape on the reel.
Figures 2, 3:
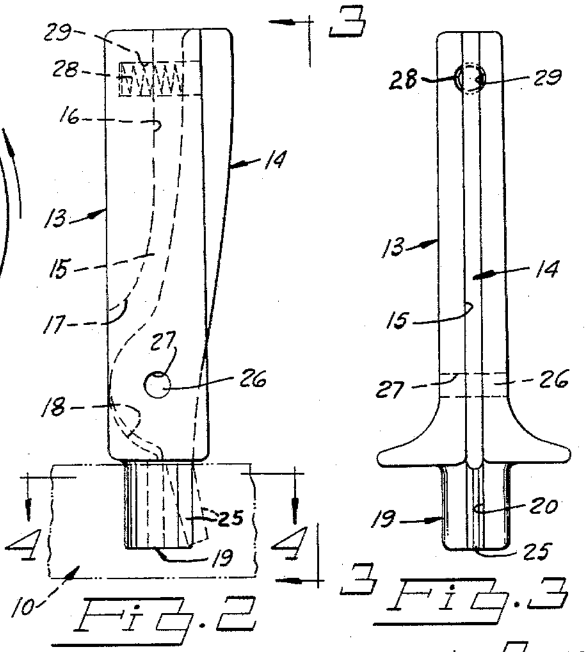
FIG. 2 is an enlarged side elevational view of the tape recorder reel starter illustrated in FIG. 1, taken along the line 2—2 thereof, and looking in the direction of the arorws.
FIG. 3 is a right side elevational view of the structure illustrated in FIG. 2, taken along the line 3—3 thereof, and looking in the direction of the arrows.

As shown in FIGS. 2 and 3, the tape starter comprises the elongated first arm or handle of substantially U-shaped cross-section, generally indicated by the numeral 13, which is adapted to be disposed with its longitudinal axis in a direction perpenticular to the reel during a tape starting operation. Pivotally mounted on the first arm 13 is a second arm, generally indicated by the numeral 14, which comprises an elongated flat body carried in the slot 15 in the first arm 13. As shown in FIGURE 2, the slot 15 extends longitudinally for the entire length of the first arm 13 and it also extends inwardly into the arm 13 from one side thereof. The upper end of the slot 15 terminates along the longitudinal line 16, as shown in FIG. 2. At the point indicated by numeral 17 the slot 15 extends completely through the arm 13 down to the portion marked 18. A tape holding seat, generally indicated by the numeral 19, is mounted integrally on the lower end of the first arm 13 and it is provided with an elongated slot 20 which is aligned with the slot 15 in the arm 13.

As shown in FIG. 4, the tape holding seat 19 is formed with a substantially half-round outer surface and a flat lower end surface. The seat 19 is provided with the tubular half-round recess 21 which faces the slot 20. An arcuate rubber cushion 22 is disposed in the recess 21 and is provided with a concave, half-round seat 23 which terminates at the ends thereof at the inner end of the slot 20. A recorder tape 24 is adapted to be held in the seat 23 without creasing or damaging the same by means of the threading blade 25 which is an extension of arm 14.

As shown in FIGS. 2 and 3, the threading blade arm 14 is mounted pivotally on the first arm 13 by means of the hinge pin 26 which is mounted operatively in the transverse hole 27 formed in the arm 13. As shown in FIGS. 3 and 4, the threading blade 25 is formed to a cross-sectional thickness smaller than the width of the slots 15 and 20 so as to leave space between the blade 25 and the sides of the slot 20 for the end of the tape 24. The blade carrying arm 14 is adapted to be biased normally to the solid line position shown in FIG. 2 by means of the coil spring 28 which is mounted in the recess 29 formed in the handle arm 13. The inner end of the spring 28 is seated in the recess 29 and the outer end thereof abuts the upper inner side of the arm 14 and normally biases the same clockwise as viewed in FIG. 2 so as to move the threading blade 25 into the slot 20 to hold a tape 24 in the rubber cushion seat 23.

In use, the recorder tape 24 would be disposed over the slot 12 in the position as indicated by the dotted line. The operator would grasp the arms 13 and 14 and press inwardly on the arm 14 against the pressure of the spring 28. The operator would then move the seat 19 downwardly into the hole 11 with the threading blade 25 moved to the dotted line position as shown in FIG. 2, so as to straddle the end of the tape 24 when in the dotted line position shown in FIG. 4. The operator then releases the pressure on the handle 14 and the spring 28 biases the handle outwardly and about the hinge pin 26 so as to move the threading blade 25 through the slot 12 and into seating engagement in the rubber cushion seat 23. It will be seen that the threading blade 25 picks up the tape 24 and threads it through the slot 12 into a gripped position in the cushioned seat 23. The normal size of the slot 12 in recorder tape reels is approximately .055". Accordingly, the threading blade 25 is made to a co-acting thickness of no longer than .050". Experience has shown that the device of the present invention provides a means whereby recorder tape may be quickly and efficiently secured in place on a recorder tape reel without kinking or creasing the tape. The arms 13 and 14 may be made from any suitable material, as for example from a suitable plastic material.

A second embodiment of the invention is shown in FIGS. 5 through 8. The second embodiment includes the first arm generally indicated by the numeral 32 which is adapted to carry the tape holding seat generally indicated by the numeral 33. The device of the second embodiment further includes the second arm generally indicated by numeral 34 which carries the tape threading blade 35. The arms 32 and 34 may be made from any suitable material, as for example from a wire rod material.

Figure 8:
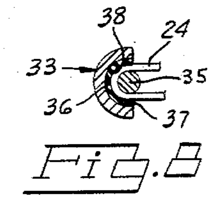
FIG. 8 is an enlarged sectional view of the structure illustrated in FIG. 7, taken along the line 8—8 thereof, and looking in the direction of the arrows.
Figure 7:
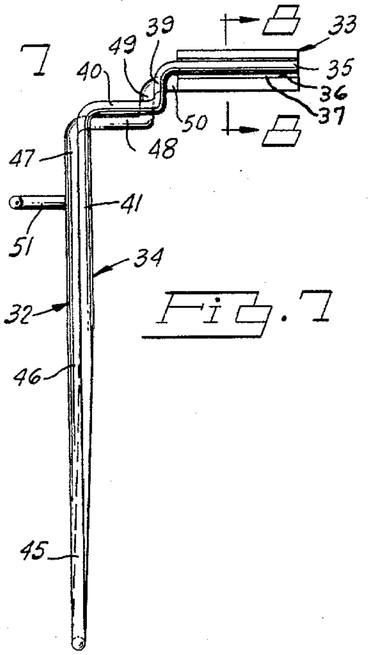
FIG. 7 is a right side elevational view of the structure illustrated in FIG. 5, taken along the line 7—7 thereof, and loking in the direction of the arrows.

As shown in FIGS. 7 and 8, the seat 33 is an elongated half-round member having the circular recess 36 in which is seated a rubber cushion 37 provided with the concave tape receiving seat 38. The blade 35 is circular in cross-section and is adapted to bias the recorder tape 24 into gripping engagement with the rubber cushion 37 during a tape starting operation.

Figure 5:
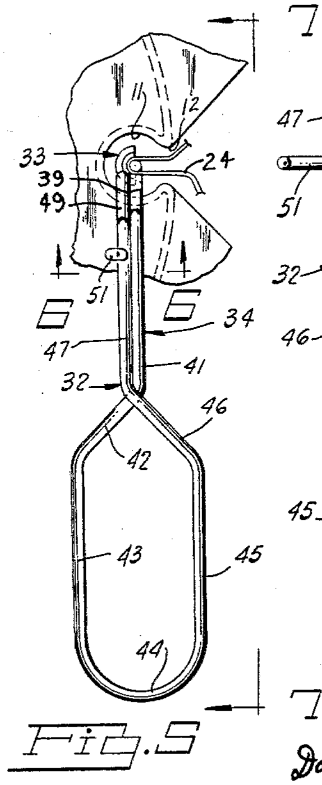
FIG. 5 is a top plan view of a second embodiment of the invention, and showing the same in an operative position in a fragmentary portion of a tape recorder reel.

As shown in FIGS. 5 and 7, the upper end of the blade 35 is integral with the portion 39 of the arm 34. The rear end of the arm portion 39 is integral with the portion 40 which extends upwardly from the portion 39 at substantially right angles thereto. Portion 39 is disposed at a substantially right angle position relative to the blade 35. The rear end of the arm portion 40 is integral with the rearwardly extended arm portion 41 which is substantially parallel to the portion 39 and at right angles to the portion 40. The arm 34 further comprises the sidewardly angled portion 42 which is connected at its front end to the rear end of the portion 41, and at its rear end to the front end of the handle portion 43. The arm portion 43 is disposed substantially parallel to the portion 41. The handle portion 43 of the arm 34 is disposed parallel to and laterally spaced apart from the arm portion 45 of the arm 32. The rear ends of the portions 43 and 45 are connected integrally by means of the bight portion 44. As shown in FIGS. 5 and 7, the arm 32 is provided with the sidewardly sloping portion 46 which is connected to the front end of the portion 45 and which extends over the angle portion 42 of the arm 34. The arm 32 is provided with the further portion 47 which is disposed above the portion 41 of arm 34 but which is parallel thereto. The front end of the arm portion 47 is connected to the right angled portion 48 which is in turn connected to the portion 49 which is substantially parallel to the portion 47. The front end of the arm portion 49 is turned at right angles as indicated by the numeral 50 in FIG. 7, and it is connected to the upper end of the seat 33 by any suitable means. As shown in FIGS. 5 and 8, the arm portion 47 is provided with a thumb engagement member 51 for use in spreading the arms 32 and 34 apart during a tape starting operation.

In the use of the embodiment of FIGS. 5 through 8, the operator would grasp the arm portions 43 and 45 in the palm of his hand and place his thumb against the member 51 and exert a pressure on the last mentioned member. This action will move the front portion 41 to the right as shown in FIG. 5 and in a position spread apart from the arm portion 47. The threading blade 35 will be moved outwardly away from the seat 33 and a thread starting operation may be carried out then in the same manner as described hereinbefore by the first embodiment. That is, the tape 24 would be disposed adjacent the tape hole 11 in the dotted position and the seat 33 would be dropped into the hole 11. The tape 24 would be straddled by the seat 33 and the spread apart blade 35 and the tape may be threaded through the slot 12 into the hole 11 by releasing the pressure on the thumb member 51.

FIGS. 9 through 15 illustrate a third embodiment of the invention. This third embodiment is similar to the first embodiment in that it includes a tape seat carrier arm and a threading blade carrier arm. The main difference is that the tape seat and the threading blade are mounted on their respective carrier arms in a position at right angles to the longitudinal axis of the arms instead of in the longitudinal direction or axis of the arms.

Figure 12:
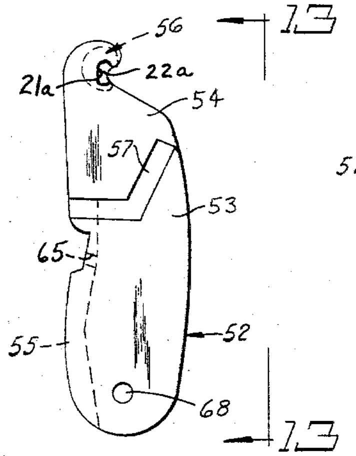
FIG. 12 is a top plan view of the seat carrying arm of the third embodiment shown in FIG. 9.
Figure 13:
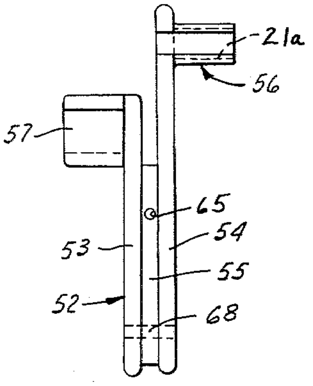
FIG. 13 is a right side elevational view of the structure illustrated in FIG. 12, taken along the line 13—13 thereof, and looking in the direction of the arrows.

As shown in FIGS. 12 and 13, the tape seat carrier arm is generally indicated by the numeral 52 and it comprises the spaced apart plates 53 and 54 which are joined along the left or rear sides thereof as viewed in FIGS. 12 and 13 by the connecting wall 55. The rear ends of the plate members 53 and 54 are rounded as shown in FIG. 12. The tape seat is generally indicated by the numeral 56 and is formed integral with the front end of the plate member 54 and extends outwardly therefrom at a 90° angle. The front end of the plate member 53 terminates at a point rearwardly from the front end of the plate member 54 and the front end of the plate member 53 is integral with the upwardly extended angle shaped finger presser member 57. The finger member 57 is formed as a flange member which extends outwardly at right angles from the plate member 53. As shown in FIGURES 12 and 13, the plate members 53 and 54 are interconnected by means of a pivot pin 68.

Figure 11:
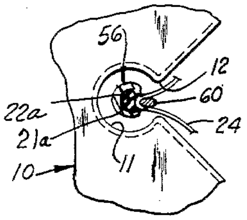
FIG. 11 is a sectional view of the structure illustrated in FIG. 10, taken along the line 11—11 thereof, and looking in the direction of the arrows.

As shown in FIG. 11, the seat member 56 is constructed in the same manner as the seat member 19 of the first embodiment and the similar parts have been marked with corresponding reference numerals followed by the smaller letter "*a*."

Figure 14:
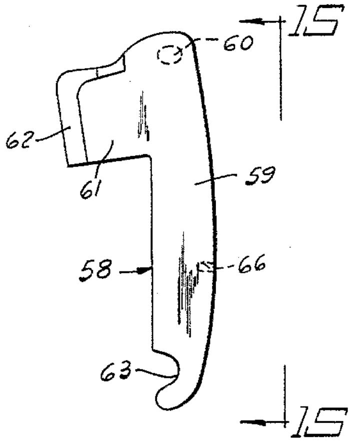
FIG. 14 is a top plan view of the threading blade carrier arm of the third embodiment illustrated in FIG. 9; and, FIG. 15 is a right side elevational view of the structure illustrated in FIG. 14, taken along the line 15—15 thereof, and looking in the direction of the arrows.
Figure 15:
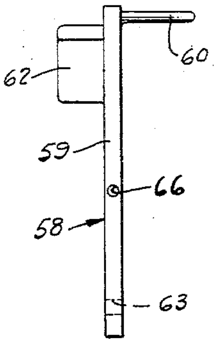

The threading blade carrier arm is shown in FIGS. 14 and 15, and it is generally indicated by the numeral 58. The blade arm 58 comprises the flat elongated plate portion 59 which is formed integral therewith on the front end thereof the threading blade 60. As shown in FIG. 15, the blade 60 extends downwardly from the plate portion 59 at right angles thereto. The plate portion 59 is provided with the sidewardly extended portion 61 on the front end thereof. On the outer edge of the plate portion 61 is provided the upwardly extended flange or finger portion 62. As best seen in FIG. 14, the plate portion 59 is provided with an arcuate or concave recess 63 on the inner side thereof toward the rear end thereof.

Figures 9, 10:
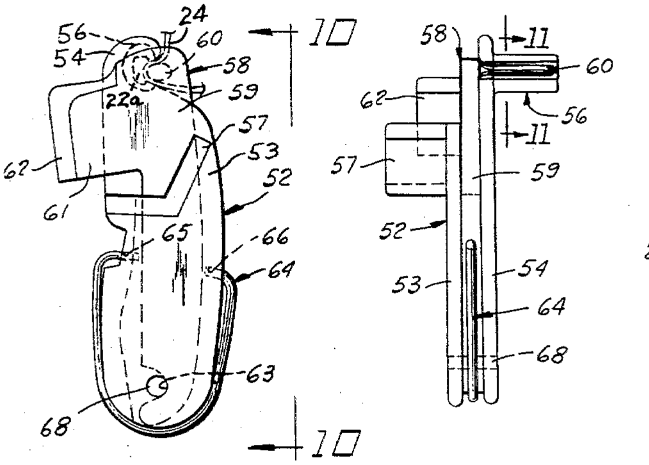
FIG. 9 is a top plan view of a third embodiment of the invention, and showing the same in an operative position in a fragmentary part of a recorder tape reel.
FIG. 10 is a right side elevational view of the structure illustrated in FIG. 9, taken along the line 10—10 thereof, and looking in the direction of the arrows.

FIGS. 9 and 10 show the blade arm 58 operatively mounted between the plate members 53 and 54 of the arm 52. The recess 63 on the blade arm 58 receives the pivot pin 68. A U-shaped spring generally indicated by the numeral 64 normally biases the blade arm 58 into the space between the arm portions 53 and 54, or in the counterclockwise direction as viewed in FIG. 9.

As shown in FIGS. 9 and 10, the spring 64 is looped around the rear ends of the arms 52 and 58 with one end mounted in the transverse hole 65 in the arm 52, and the other end mounted in the transverse hole 66 in the arm 58. It will be seen that the tension of the U-shaped spring 64 biases the blade 60 into the tape seat 56.

In use, the operator grasps the device by the finger flanges 57 and 62 and squeezes against these members in order to bring them together and pivot the blade 60 out of the seat 56. The seat 56 is then lowered into the reel hole 11 with the blade 60 straddling the tape 30. The operator then releases the pressure on the finger members 57 and 62 and the spring 64 moves the threading blade 60 inwardly into the seat 56 to thread the tape 24 into the hole 11. The reel 10 is then moved in the counterclockwise direction as viewed in FIG. 11, until the tape 24 is wound around the hub of the reel a few times and then the device may be released from the tape by pressing the finger members 57 and 62 together to move the blade 60 out of the seat 56 and to remove the device from the reel.

While it will be apparent that the preferred embodiments of the invention herein disclosed are well calculated to fulfill the objects above stated, it will be appreciated that the invention is susceptible to modification, variation and change without departing from the proper scope or fair meaning of the subjoined claims.

What I claim is:

1. In an apparatus for starting a tape on a tape recorder reel by inserting a free end of the tape through a slot into a hole in the hub of the reel, the combination comprising: a first arm having a substantially U-shaped cross-section, a second arm pivotally attached to said first arm and adapted to pivot within the U of said first arm, biasing means positioned at one end of said first arm to urge said second arm in a direction away from said end of said first arm, a hollow tape holding seat extending outwardly from the other end of said first arm and adapted to position the free end of the tape in the hole in the hub of the reel, a threading blade extending outwardly from said second arm and adapted, upon actuation of said second arm, to move the free end of the tape through the slot and into nesting relationship with the hollow portion of said tape holding seat in the hole in the hub in the reel.

2. In an apparatus for starting a tape on a tape recorder reel by inserting a free end of the tape through a slot into a hole in the hub of the reel, the combination comprising: a cushioned tape holding seat member; a first carrier means connected to said seat member for inserting the seat member into the hole in the reel hub; a second carrier means movably mounted on said first carrier means; a blade supported by said second carrier means and operable to engage the free end of a tape and pull it through said slot and into said seat member and to hold the tape in said seat member; and means for normally biasing said second carrier means in a first direction relative to said first carrier means to move said blade into said seat member and to permit the second carrier means to be moved manually in a second direction relative to the said first carrier means to spread the seat member and blade apart for receiving a tape therebetween, said first and second carrier means each comprising an elongated spring rod member, and said tape holding seat member and blade being mounted on their respective spring rod members at one end thereof and extended angularly outward therefrom.

3. In an apparatus for starting a tape on a tape recorder reel by inserting a free end of the tape through a slot into a hole in the hub of the reel, the combination comprising: a first tape seat carrier arm, a second tape seat carrier arm spaced from said first tape seat carrier arm, means joining said first and second tape seat carrier arms, a tape seat extending angularly outward from said first and second tape seat carrier arms to position the free end of the tape in the hole in the hub of the reel, a threading blade carrier arm interposed between, and pivotally attached to said first and second tape seat carrier arms, and a threading blade extending angularly outward from said threading blade carrier and adapted, upon actuation of the threading blade carrier arm, to move the free end of the tape through the slot and into nesting relationship with said tape seat in the hole in the hub in the reel.

References Cited by the Examiner

UNITED STATES PATENTS

| | | | |
|---|---|---|---|
| 298,155 | 5/1884 | Atwood | 81—418 X |
| 1,454,778 | 5/1923 | Wegner | 81—420 X |
| 2,290,853 | 7/1942 | Frankel | 242—74.2 |
| 3,062,468 | 11/1962 | Braun | 242—74 |

STANLEY N. GILREATH, *Primary Examiner.*

M. STEIN, N. L. MINTZ, *Assistant Examiners.*